United States Patent

[11] 3,600,747

| [72] | Inventor | John R. McCarty<br>Akron, Ohio |
|---|---|---|
| [21] | Appl. No. | 826,627 |
| [22] | Filed | May 21, 1969 |
| [45] | Patented | Aug. 24, 1971 |
| [73] | Assignee | The Firestone Tire & Rubber Company<br>Akron, Ohio |

[54] SYSTEM FOR CALENDER CONTROL
23 Claims, 3 Drawing Figs.

[52] U.S. Cl. .................................................. 18/2 C,
100/47, 241/37
[51] Int. Cl. .................................................. B29d 7/14
[50] Field of Search .................................. 18/2 C, 2 I,
9, 10, 11; 100/168, 170, 47; 241/37; 38/52, 53, 54;
72/16, 240

[56] References Cited
UNITED STATES PATENTS

| 2,312,310 | 3/1943 | Bradner et al. | 100/47 |
| 2,312,726 | 3/1943 | Munro | 100/47 |
| 2,545,921 | 3/1951 | Goodwillie et al. | 18/2 X |
| 2,575,590 | 11/1951 | Goulding, Jr. | 18/2 |
| 3,023,695 | 3/1962 | Kuster | 100/170 |
| 3,045,222 | 7/1962 | Spergel | 100/47 X |
| 3,084,314 | 4/1963 | Ziffer | 100/47 X |
| 3,135,018 | 6/1964 | Smith | 18/2 |
| 3,292,869 | 12/1966 | Beyeler | 100/47 X |
| 3,509,815 | 5/1970 | Lloyd | 100/47 |

Primary Examiner—Frank T. Yost
Attorneys—S. M. Clark and Gordon B. Seward

ABSTRACT: An apparatus for controlling the thickness of material in a calender system. The sheeting roll gap is regulated by a plurality of hydraulic cylinders which are supplied with the precise amount of fluid by a servo valve. An error-measuring device can actuate, for example, a series of pressure switches or a potentiometer circuit to impose a signal on the servo valve which can be made proportional to the speed of the calender to compensate for a lag between the error-measuring device and the calender-positioning control. The apparatus can also be readily adapted to prevent pinch off of the material when the calender stops and to allow facile changes to be made in the specification of the material being calendered.

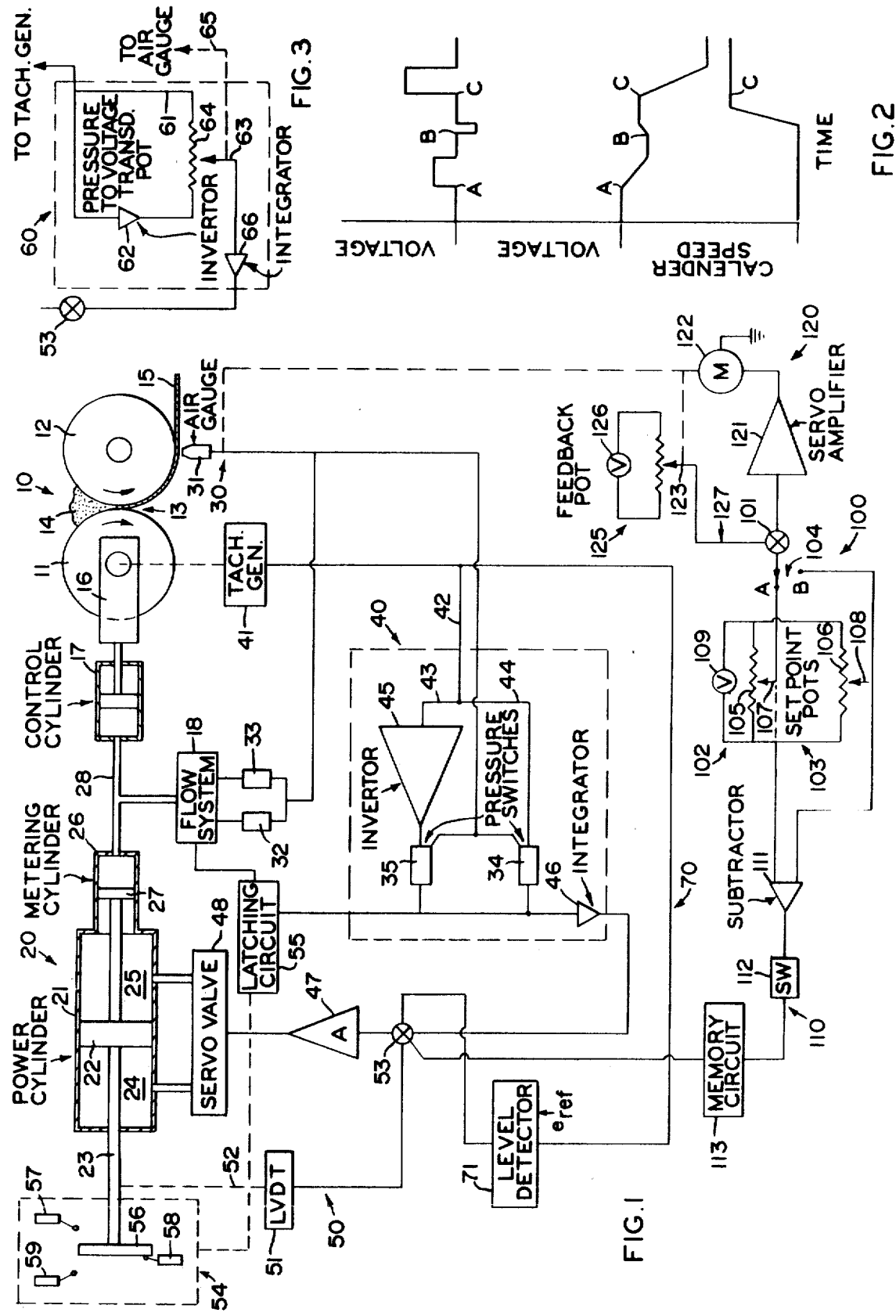

3,600,747

SYSTEM FOR CALENDER CONTROL

BACKGROUND OF THE INVENTION

This invention relates to an apparatus for controlling the thickness of sheet material produced in a calender system. The calender roll position is automatically adjusted so as to maintain product thickness over a wide range of calendering speeds.

Calenders are used in many industries for sheeting or coating materials such as rubber, plastic, paper, metal or other material which is capable of being compressed through the calender rolls. In applications where the product of the calender system is a very thin sheet of material, such as is used in the manufacture of tires, it is critical, not only for economic reasons but also for safety considerations, that the sheets be of the same thickness throughout their length.

Variations in thickness can arise due to defects in the symmetry of a calender roll, due to temperature changes of the roll or the material, or due to any number of other factors including the inconsistent nature of the rubber itself. Various types of measuring devices have been employed to detect the existence of a thickness error such as air gauges which utilize a pressure system of detection, beta gauges which use a radiation system to determine product mass per unit area, or standard roller thickness gauges.

Whatever the measuring device, if an error exists, it is important to correct it immediately before too much material not conforming to specifications is produced. To this end, calender rolls are generally positioned in a bearing box so that they can be moved with respect to each other. In some cases one roll is fixed and the other is movable toward and away from the other by means of a motor-driven screw. In other instances the movable roll is positioned by means of hydraulic cylinders interposed between the frame and the bearing box at each end. In this latter case, the space between the rolls may be varied by movement of the hydraulic cylinder. However, the metering of the precise amount of hydraulic fluid to effect a desired correction has always been a problem which has remained unsolved.

A control correction system utilizing fixed flow rates will result in fixed rates of movement of the bearing box. However, such control systems employing fixed correction rates are characterized by an instability or oscillation due to a transportation delay. Such transportation delay is inherent in these systems due to the fact that the deviation-measuring device must take the measurement at a position some distance from the calender bite. Therefore, there is a timelag, dependent upon calender speed, from the time when thickness is determined to the time when it is measured. Thus, the speed at which thickness corrections are made is limited by the distance of the measuring gauge from the bite and the calender speed. It is evident that if too high a correction rate is attempted, the system will "oscillate," or continually overshoot the desired range. The result is that the calender will first produce a material that is too thick, and then one that is too thin. Many systems have been devised in an attempt to alleviate this situation, however most are unsuccessful or unduly complex in design.

Another unfortunate characteristic of the calender system of producing sheet materials is that because of the resilient nature of the calender frame, the calender rolls tend to separate due to the force supplied by the material as it travels therethrough. When it becomes necessary to stop the calender, it is common for the rolls to come together and touch as the spreading force due to the sheeting material is removed. This phenomenon is known as "pinch off." When the calender is used for coating sheet material, this results in a bare section on the coated material. In the tire-building industry, for example, this will undoubtedly produce a defective tire. In the situation where the calender is sheeting material, pinch off can result in either a partial or total cutting of the sheet and an attendant discontinuity in the material. In this latter situation, there is a loss of system efficiency and the need to rethread the material through the train following the calender.

When a single calender is used to produce a product of varying thickness, it may be necessary to change the mass of material from one thickness to another while the calender is operating at high speeds. It is inherent that during the transition period from one thickness to another, there will be an unusable area of material of a thickness between the two desired. This unusable area should, if for no other reason than economy, be minimized, but is commonly excessive since the best transition periods to date are several seconds on calender devices running at a yard or two of material per second.

SUMMARY OF THE INVENTION

It is, therefore, a primary object of the present invention to provide a device for controlling the positioning cylinder on a calender rapidly and accurately through a precise metering of the fluid flow. It is another object of the present invention to provide a control device, as above, which automatically adjusts product thickness over a wide range of calender speeds. It is still another object of the present invention to provide a control device, as above, which alleviates oscillation in a calender system due to the transportation delay. It is yet another object of the present invention to provide a control device, as above, which will prevent pinch off if the calender is stopped. It is a further object of the present invention to provide a control device, as above, which is able to accurately and rapidly change the specifications of the material being calendered. It is a still further object of the present invention to provide a control device, as above, which can be adapted for use with a wide variety of error measuring devices. These and other objects, which will become apparent from the following specification, are accomplished by means hereinafter described and claimed.

In general, a calender control system constructed according to the concept of the present invention comprises a hydraulic intensifier which is supplied precise amounts of fluid through a servovalve. In order to obtain automatic control of product thickness, a deviation signal is obtained from a thickness-measuring device. This signal actuates the servo valve and can be made proportional to both calender speed and thickness error to overcome transportation lag.

In order to prevent pinch off of the calendered material as the calender comes to a stop, a signal is provided to the servo valve to withdraw a fixed volume of fluid at the precise point in time that pinch off would occur, thus relieving the tension in the frame and preventing the rolls from touching. In a somewhat similar manner, the present invention is able, through an independent servo-loop, to make changes in the specification of the material rapidly and precisely.

A preferred embodiment of the present invention is shown by way of example in the accompanying drawings and hereinafter described in detail without attempting to show all of the various forms and modifications in which the invention might be embodied; the invention being measured by the appended claims and not by the details of the specification.

BRIEF DESCRIPTION OF THE DRAWINGS

FIG. 1 is a block schematic diagram of a system embodying the principles of the present invention.

FIG. 2 is a series of graphs showing the voltage received from deviation measurement; the voltage supplied to the intensifier system; and calender speed, all as a function of time.

FIG. 3 is a block schematic diagram of an energizing control circuit which forms an alternate embodiment of the present invention.

DESCRIPTION OF THE PREFERRED EMBODIMENT

A calender device according to the concept of the present invention is indicated generally by the numeral 10 in FIG. 1.

The calender 10, as shown, has rolls 11 and 12 which rotate in opposite directions as indicated by the arrows. The rolls 11 and 12 are positioned proximate to each other so as to form a bite 13 into which is fed a bank of material 14, such as rubber gum stock. While it is understood that this invention is equally applicable in the manufacture of sheets, films, or coating of other material such as plastic, paper, metals and the like, the discussion herein will use rubber as an exemplary material being calendered. The bank of material 14 is fed through the bite 13 to form a continuous output sheet of material 15, such as tread stock for the manufacture of tires.

In order to regulate the size of bite 13 and therefore the thickness of sheet 15, calender roll 11 is mounted with a bearing box 16 at each end of roll 11 both ends of which can be moved toward and away from roll 12 by control cylinders 17 one of which is shown and discussed herein. Cylinder 17 can be mechanically connected to roll 11 in any of a number of ways well known in the art so that its displacement to the right in FIG. 1, will move roll 11 closer to roll 12 to produce a thinner sheet 15.

As will hereinafter be explained in more detail, control cylinder 17 may receive its actuation fluid from a regulation device comprising either independently or together a flow system 18 operating in conjunction with a fluid source, or an intensifier system, indicated generally by the numeral 20. The intensifier 20 includes a double-acting power cylinder 21 having a piston 22 and a piston rod 23 extending from each end of piston 22. The power cylinder 21 is thus divided into two chambers 24 and 25. The piston rod 23 extends through an end wall of chamber 25 into a metering cylinder 26 having a piston 27 to which it is attached. The metering cylinder 26 is connected to control cylinder 17 via a fluid hose 28.

A deviation-sensing system, generally indicated by numeral 30 in FIG. 1, provides a signal to the flow system 18 or the intensifier 20. The deviation-sensing system 30 is shown with an air gauge 31; however, it is evident that the system could be adapted to operate with other standard measuring devices such as beta gauges. The gauge 31 is located in close proximity to bite 13, a distance of some 8 to 10 inches providing good results. In present practice, air gauges are suspended near the sheet (approximately 0.008 inches away) and supplied with a regulated pressure. The sheet 15 acts as a restriction to this pressure and any deviation in desired thickness of this restriction is sensed by a corresponding increase or decrease in the back pressure obtained on the gauge 31.

In the event of a large or "gross" error in the thickness of the material 15, the air gauge 31 will act to close either positive pressure switch 32 or negative pressure switch 33. A "gross" error for the calendering of rubber can be defined as one where the deviation is plus or minus 0.0015 inch. For purposes of this description, error will be called "positive" if the material 15 is too thick and "negative" if the material 15 is too thin. Assuming that a positive error of over 0.0015 inches is sensed by gauge 31, switch 32 would be closed and a fast-acting valve in the flow system 18 would add fluid to the control cylinder 17 displacing it to the right in FIG. 1 and therefore decrease the bite 13. A negative error would similarly close switch 33 and cause the flow system to withdraw fluid from cylinder 17 to increase the thickness of the material 15.

In order to provide for a fine or vernier control, the air gauge 31 is also connected to positive pressure switch 34 and negative pressure switch 35. These switches can be set to be actuated on a smaller error, on the order of plus or minus 0.0005 inches, in the same manner as discussed above with respect to switches 32 and 33. Switches 34 and 35 however, instead of being coupled to the flow system 18 are part of a control circuit, indicated generally by the numeral 40, which energizes intensifier 20.

A tachometer generator 41 is coupled to calender roll 11 and provides a voltage to circuit 40 proportional to the speed of the calender. The purpose of using a voltage source such as tachometer generator 41 is to excite the control system proportionally with the speed and therefore to compensate for transportation lag inherent in the system. This voltage is channeled via line 42 to lines 43 and 44 which are either open or closed depending upon the above-described operation of pressure switches 34 and 35. Line 43 includes an invertor 45 which acts to invert the voltage signal so that it will provide a negative signal to an integrator 46, if negative pressure switch 35 has been closed. Similarly, line 44 provides a positive signal to integrator 46 if positive pressure switch 34 has been closed. An exemplary positive signal is shown in the upper graph of FIG. 2. At such a point in time that a positive signal is received, point A for example, the integrator 46 then will generate a ramp voltage (middle graph of FIG. 2) which is fed to the intensifier system 20. Due to the electronic arrangement of this integrator, a negative ramp is shown as the output in the preferred embodiment. However, the system could be such that a positive signal would be provided, such being merely a matter of choice. The voltage generated by integrator 46 is then amplified by a standard amplifier 47 and sent to a servo valve 48 which is a standard item, such as that sold by Moog, Incorporated, Model No. 76—103. The valve 48 is arranged so that it communicates with chambers 24 and 25 of the power cylinder 21. In the example shown in FIG. 2, the pressure switch 34 has been closed at point A indicating a positive error (the material being too thick). The negative ramp provided by integrator 46 then causes the servo valve to put fluid into chamber 24 of power cylinder 21. This displaces the piston 22 and thus piston 27 to the right in FIG. 1, causing the control cylinder to move calender roll 11 toward roll 12 to correct the error.

In order to achieve high frequency stability in the system, there is provided a position feedback control loop, indicated generally by the numeral 50. The primary component of feedback loop 50 is a linear variable differential transformer (LVDT) 51, which as is well known in the art, provides an output signal according to the displacement of a core. In this system, that core is mechanically connected, as at 52, to piston rod 23. Thus the position of the piston 22 is constantly monitored and fed back to the input point 53. When the position of the piston 22 is such that the precise amount of fluid has been added and the error drops below the threshold setting of the pressure switch 34, the movement of the intensifier 20 will cease.

It is evident that should the material 15 become too thin, a negative error would be read by air gauge 31. If, as described above, this were a "gross" error, pressure switch 33 would close to actuate flow system 18 to withdraw fluid from the control cylinder 17. If the error were smaller, yet above the setting of the vernier negative switch 35, it would then close and the signal from the tachometer generator 41 might be shown as at B in the upper graph of FIG. 2. As is shown in the lower graph of FIG. 2 and as is indicated by the fact that the voltages at points A and B are the same (except for opposite polarities), there has been no change in speed of the calender from point A to point B. However, the error beginning at point B is shown to be of smaller duration in time. The output of integrator 46 in such a situation is similarly shown in FIG. 2 at B, this time as a small positive ramp. This would actuate the servo valve 48 to put fluid into chamber 25 of the power cylinder 21. The feedback loop 50 would again read the position of the cylinder.

Shown at point C in time in FIG. 2 is another positive error, however, the tachometer voltage is now shown as being greater as the result of an increase in speed of the calender rolls between points B and C as shown in the lower graph of FIG. 2. The correction rate is not proportionally increased as reflected by the steeper negative ramp of the integrator output. Should at any time either due to such a large signal or due to a series of smaller signals of the same polarity, the piston 22 be extended too far in either direction within cylinder 21, the limit switches, indicated generally by the numeral 54, are actuated. For example, were such a signal, as shown at C in FIG. 2, to cause the piston 22 to move too far to the right in FIG. 1, a trip block 56 at the end of rod 23 would contact the high extreme limit switch 57. This causes a latching circuit 55, which is a grouping of standard common logic components, to actuate the flow system 18 allowing fluid to be introduced into line 28 at a fixed rate and also locks in a fixed voltage to the integrator 46. This in turn causes the servo valve 48 to emit the precise amount of fluid into chamber 25 at a rate synchronous with the flow system 18 so that there is no net displacement of the control cylinder 17. However, the aforementioned error system will still function during this fill cycle should error occur simultaneous with the recentering process. When the piston 22 reaches the center again, block 56 contacts center switch 58 which resets the latching circuit 55 so as to drop out the fixed voltage and the oil addition from flow system 18. The low extreme limit switch 59 works in a similar manner as switch 57.

The control system discussed thus far is capable of precise control at two discreet levels of error. These levels are determined by the settings of the pressure switches 32 and 33 for large errors, and switches 34 and 35 for smaller errors. In the examples, an error of plus or minus 0.0005 has been used as a typical example of smaller errors. Should it be desirable, under certain conditions in some industries, to control all error, even below such a setting as 0.0005 inches, tachometer generator 41 can be used to excite, in lieu of flow system 18 and control circuit 40, a control system, indicated generally by the numeral 60 as shown in FIG. 3. Control system 60 consists largely of a transducer potentiometer circuit 61, having an invertor 62 in one line acting similar to invertor 45 previously discussed. The movement of contact 63 on the slide-wire 64 of potentiometer 61 is made proportional to the error as read by the air gauge 31. This correlation is shown schematically by the dotted line 65 in FIG. 3 and may be accomplished by means known in the art. Thus the voltage supplied to integrator 66 will be continually varied, proportional to the product of line speed and product deviation, to correct even the smallest of errors. The output of the integrator 66 can be, like that of integrator 46, sent to the input point 53 to energize the intensifier system 20.

For the purpose of preventing the phenomenon of pinch off, as previously discussed, there is provided a pinch off prevention loop, generally indicated by the numeral 70 which couples a level detector or comparator 71 with the tachometer generator 41. The level detector 71 is therefore provided with a voltage directly proportional to speed. If the calender were to come to a stop, that voltage would be zero. To prevent pinch off, which occurs when the calender comes to a stop, a reference voltage, indicated by $e_{ref}$ in FIG. 1, is also supplied to the comparator. This voltage can be set to correspond to the tachometer voltage which is generated at a speed just above zero. As is known in the art, the level detector 71 is able to detect small differences between these two voltages based on a ratio of one over the gain of an amplifier in the comparator. When the tachometer voltage becomes slightly less than the reference voltage, indicating that the speed of the calender is approaching zero, a coordinated step function is induced by the level detector 71 into the input point 53 to direct the servo valve 48 to rapidly move piston 22 in a direction to remove fluid from the line to decrease the force on calender roll 11 to spread the rolls apart and therefore compensate for pinch off. The servo valve selected for this performance should be one capable of quick reaction, on the order of 20 milliseconds.

The circuit which allows the operator of the above-described system to change thickness specifications of the output material rapidly is indicated generally by numeral 100. A summing junction 101 is supplied with voltage from either one of two set point potentiometers, 102 and 103 respectively, depending on the position of switch 104. As shown, switch 104 is in contact with point A and potentiometer circuit 102 is closed.

Set point potentiometers 102 and 103 have slide-wires 105 and 106 and pointers 107 and 108, respectively, and are powered by voltage source 109. As is shown and more fully to be described, the calender system is operating with a set point of the air gauge 31 as dictated by set point potentiometer 102, switch 104 being at position A. When a change in specification is desired, the operator would prepare by presetting pointer 108 on slide-wire 106 to the desired specification. The difference in the voltages of the two potentiometer systems is recorded by a subtractor 111 of the memory control system 110. At the instant that the specification change is desired, the operator turns switch 104 to position B and simultaneously closes switch 112.

The closing of switch 112 allows the signal from the subtractor 111 to be stored in the analog memory circuit 113. Since circuit 113 has the capabilities of retaining a voltage even after the supply is turned off, switch 112 can be immediately opened again for later actuation. The memory circuit 113 induces a step voltage at input point 53 which causes the integrator 20 to immediately effect the desired thickness change.

At the same time that control system 110 is operating to rapidly change the material thickness, the fact that the operator has moved switch 104 to position B induces a voltage into servosystem 120 in which a servoamplifier 121 energizes a motor 122. Motor 122 is coupled to air gauge 31 so that upon actuation, air gauge 31 will be moved toward or away from the material.

It is important to note that since the system 110 is able to respond much faster than servosystem 120, roll gap for the desired specification will be set to its approximate final position before the air gauge 31 is moved to its final location. The automatic control of thickness utilizing the error signal from the air gauge can be delayed until the air gauge has reached a balance. The system then proceeds to control as described above.

The movement of the air gauge 31 also reflects movement of the pointer 123 on slider 124 of feedback potentiometer 125 energized by voltage source 126. The feedback potentiometer thus closes the position-servo-loop 127 so that when air gauge 31 has been moved to its new set point, circuit 100 deactivates. Should a further change in specification be desired at a later time, set point potentiometer 102 is available to be preset for the change and will be actuated by moving switch 104 to position A.

It should now be evident that a calender control system constructed according to the foregoing description will substantially improve the calender control art and otherwise accomplish the objects of the present invention.

I claim:

1. In a calendering device, a system for regulating the position of a calender roll to control the thickness of the output material comprising, a control cylinder for positioning the calender roll, deviation-sensing means for signaling a variation from a desired thickness in the material, regulating means hydraulically coupled to said control cylinder, said regulating means including an intensifier means, and means for energizing said regulating means responsive to a signal from said deviation-sensing means.

2. A system according to claim 1, wherein said regulating means also includes a flow system actuated by at least one pressure switch.

3. A system according to claim 1, wherein said means for energizing said regulating means comprises a control circuit having means for generating a voltage proportional to calender speed.

4. A system according to claim 3, wherein said voltage-generating means is a tachometer generator and said control circuit includes a potentiometer network means having a slide-wire contact responsive to a signal from said deviation-sensing means.

5. A system according to claim 4, wherein said control circuit includes an integrator means having an output voltage which energizes said intensifier means.

6. A system according to claim 1 wherein a servo valve means controls said intensifier means.

7. A system according to claim 6, wherein said regulating means comprises a control circuit having means for generating a voltage proportional to speed.

8. A system according to claim 7, wherein said control system includes at least one pressure switch responsive to the signal from said deviation-sensing means.

9. A system according to claim 8, wherein said deviation-sensing means is an air gauge located in a spaced relation with the output material.

10. A system according to claim 9, wherein said control system includes an integrator means adapted to integrate the input of the voltage-generating means upon the closing of a said pressure switch.

11. A system according to claim 10, wherein the output of said control system activates said servo valve means.

12. A system according to claim 1, wherein said intensifier means comprises a metering cylinder having a piston, said metering cylinder being hydraulically coupled to said control cylinder, and a double acting power cylinder having a piston mechanically coupled with the piston of said metering cylinder so that movement of the piston of said power cylinder causes movement of the piston of said metering cylinder.

13. A system according to claim 12 wherein a servo valve communicates with said power cylinder for controlling the movement thereof.

14. A system according to claim 13 having switch means for maintaining said intensifier in an operative position.

15. A system according to claim 13 wherein a position feedback loop generates a signal to the input of said servo valve, said feedback signal being proportional to the position of the piston of said power cylinder.

16. A system according to claim 15 wherein said energizing means includes a control circuit having for generating a voltage proportional to calender speed, and an integrator means controlling said servo valve.

17. In a calendering device, a system for regulating the position of a calender roll to control the thickness of the output material comprising, a control cylinder for positioning the calender roll, deviation-sensing means for signaling a variation from a desired thickness in the material, regulating means hydraulically coupled to said control cylinder, means for energizing said regulating means responsive to a signal from said deviation-sensing means, and a comparator loop responsive to a means for generating a voltage proportional to speed, said comparator loop detecting the point at which said generated voltage becomes less than a set reference voltage, said comparator loop then activating said regulating means.

18. A system according to claim 17 wherein said voltage-generating means is a tachometer generator and said comparator loop includes a level detector.

19. In a calendering device, a system for regulating the position of a calender roll to control the thickness of the output material comprising, a control cylinder for positioning the calender roll, deviation sensing means for signaling a variation from a desired thickness in the material, regulating means hydraulically coupled, to said control cylinder, set point potentiometer means controlling the position of said deviation-sensing means controlling the position of said deviation-sensing means with respect to the output material and actuating a memory control system coupled to said regulating means, and means for energizing said regulating means responsive to a signal from said deviation-sensing means.

20. A system according to claim 19 wherein said deviation-sensing means is an air gauge and said set point potentiometer means actuates a motor coupled with said air gauge.

21. A system according to claim 20 having a feedback potentiometer means responsive to the movement of said air gauge.

22. A system according to claim 19 wherein said set point potentiometer means includes two potentiometer circuits, said potentiometer circuits supplying a voltage to said memory control system.

23. A system according to claim 22 wherein said memory control system includes a subtractor means for determining the difference between the voltage from said potentiometer circuits, a switch means, and a memory circuit, so that actuation of said switch means stores the voltage determined by said subtractor in said memory circuit to activate said regulating means.

PO-1050
(5/69)

UNITED STATES PATENT OFFICE
CERTIFICATE OF CORRECTION

Patent No. 3,600,747      Dated August 24, 1971

Inventor(s)     JOHN R. McCARTY

It is certified that error appears in the above-identified patent and that said Letters Patent are hereby corrected as shown below:

Col. 7, line 33 should read as follows:

--means includes a control circuit having means for generating a volt- --

Signed and sealed this 4th day of April 1972.

(SEAL)
Attest:

EDWARD M. FLETCHER, JR.            ROBERT GOTTSCHALK
Attesting Officer                    Commissioner of Patents